US011802618B2

(12) United States Patent
Yamashita

(10) Patent No.: US 11,802,618 B2
(45) Date of Patent: Oct. 31, 2023

(54) APPARATUS FOR DIAGNOSING REMAINING BELT LIFE

(71) Applicant: TOYOTA JIDOSHA KABUSHIKI KAISHA, Toyota (JP)

(72) Inventor: Yoshiya Yamashita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 255 days.

(21) Appl. No.: 17/379,031

(22) Filed: Jul. 19, 2021

(65) Prior Publication Data

US 2022/0090672 A1    Mar. 24, 2022

(30) Foreign Application Priority Data

Sep. 18, 2020  (JP) .................................. 2020-157764

(51) Int. Cl.
*F16H 57/01* (2012.01)
*G01M 13/023* (2019.01)

(52) U.S. Cl.
CPC .......... *F16H 57/01* (2013.01); *G01M 13/023* (2013.01)

(58) Field of Classification Search
None
See application file for complete search history.

(56) References Cited

U.S. PATENT DOCUMENTS

2018/0328482 A1\*  11/2018  Kanehara .............. F16H 61/662

FOREIGN PATENT DOCUMENTS

| JP | H0727671 A | * | 1/1995 |
| JP | 2010-054403 A | | 3/2010 |
| JP | 2011247306 A | * | 12/2011 |

OTHER PUBLICATIONS

Attached translation of JPH0727671A (Year: 1995).*

\* cited by examiner

*Primary Examiner* — Matthew G Marini
(74) *Attorney, Agent, or Firm* — Finnegan, Henderson, Farabow, Garrett & Dunner, LLP

(57) ABSTRACT

An apparatus for diagnosing remaining belt life is configured to diagnose the remaining life of a belt driven by an engine. The remaining life of the belt is diagnosed based on frequency distribution of an operation point that is made up of speed of the engine and a load factor of the engine or a fuel injection rate. This makes it possible to achieve accurate diagnosis of the remaining life of the belt.

7 Claims, 6 Drawing Sheets ured to diagnose the remaining life of a belt driven by an engine. The remaining life of the belt is diagnosed based on frequency distribution of an operation point that is made up of a speed of the engine and a load factor of the engine or a fuel injection rate.

APPARATUS FOR DIAGNOSING REMAINING BELT LIFE

CROSS-REFERENCE TO RELATED APPLICATION

This application claims priority to Japanese Patent Application No. 2020-157764 filed on Sep. 18, 2020, incorporated herein by reference in its entirety.

BACKGROUND

1. Technical Field

The present disclosure relates to apparatuses for diagnosing remaining belt life, and more particularly relates to an apparatus for diagnosing remaining belt life that is configured to diagnose the remaining life of a belt driven by an engine.

2. Description of Related Art

As this type of apparatuses for diagnosing remaining belt life, there has conventionally been proposed an apparatus configured to diagnose the life of a belt (V-ribbed belt) (see, for example, Japanese Unexamined Patent Application Publication No. 2010-54403 (JP 2010-54403 A). The belt is formed by laminating a compressed rubber layer, an adhesive rubber layer, and a canvas covered with rubber. The compressed rubber layer is in pressure contact with a power transmission member such as a pulley. The adhesive rubber layer is in contact with the compressed rubber layer. The canvas covered with rubber is in contact with the adhesive rubber layer. The apparatus estimates the amount of strain generated in the adhesive rubber layer by using an elastic analysis program based on a finite element model and use conditions of the belt, and diagnoses the remaining life of the belt based on the estimated amount of strain.

SUMMARY

However, since the above apparatus for diagnosing remaining belt life uses the amount of strain estimated by using the elastic analysis program, an error between the estimated strain amount and the actual strain amount may become greater. When the error between the estimated strain amount and the actual strain amount becomes greater, it is difficult to accurately diagnose the remaining belt life.

A primary object of the apparatus for diagnosing remaining belt life of the present disclosure is to accurately diagnose the remaining life of a belt.

The apparatus for diagnosing remaining belt life of the present disclosure adopts following means in order to accomplish the primary object.

An apparatus for diagnosing remaining belt life of the present disclosure is an apparatus for diagnosing remaining belt life configured to diagnose the remaining life of a belt driven by an engine. The remaining life of the belt is diagnosed based on frequency distribution of an operation point that is made up of a speed of the engine and a load factor of the engine or a fuel injection rate.

In the apparatus for diagnosing remaining belt life of the present disclosure, the remaining life of the belt is diagnosed based on frequency distribution of an operation point that is made up of a speed of the engine and a load factor of the engine or a fuel injection rate. As a result, the remaining life of the belt can accurately be diagnosed compared to the remaining life diagnosed with the amount of strain estimated using the elastic analysis program.

In the apparatus of the present disclosure, a deterioration degree of the belt may be set based on the frequency distribution and a plurality of determination frequency distributions defined for respective deterioration degrees of the belt, and the remaining life may be diagnosed based on the set deterioration degree. This allows more appropriate diagnosis of the remaining life of the belt.

In this case, among the determination frequency distributions, the determination frequency distribution for a higher deterioration degree may be higher in frequency of the operation point being within a resonance area than the determination frequency distribution for a lower deterioration degree, the resonance area being an operation area of the engine where resonance is generated on the belt. Among the determination frequency distributions, the determination frequency distribution for a higher deterioration degree may be higher in frequency of an idle operation point relating to idle operation of the engine than the determination frequency distribution for a lower deterioration degree. This makes it possible to provide more appropriate determination frequency distributions and allows more accurate diagnosis of the remaining life of the belt.

In the apparatus of the present disclosure, when, in the frequency distribution, the frequency of the operation point being within the resonance area where resonance is generated on the belt is high, the remaining life may be diagnosed to be shorter than when the frequency is low. This allows more appropriate diagnosis of the remaining life of the belt.

Furthermore, in the apparatus of the present disclosure, when, in the frequency distribution, the frequency of the operation point being an idle operation point relating to idle operation of the engine is high, the remaining life may be diagnosed to be shorter than when the frequency is low. This allows more appropriate diagnosis of the remaining life of the belt.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Now, aspects for carrying out the present disclosure will be described based on embodiments.

Figure 1:
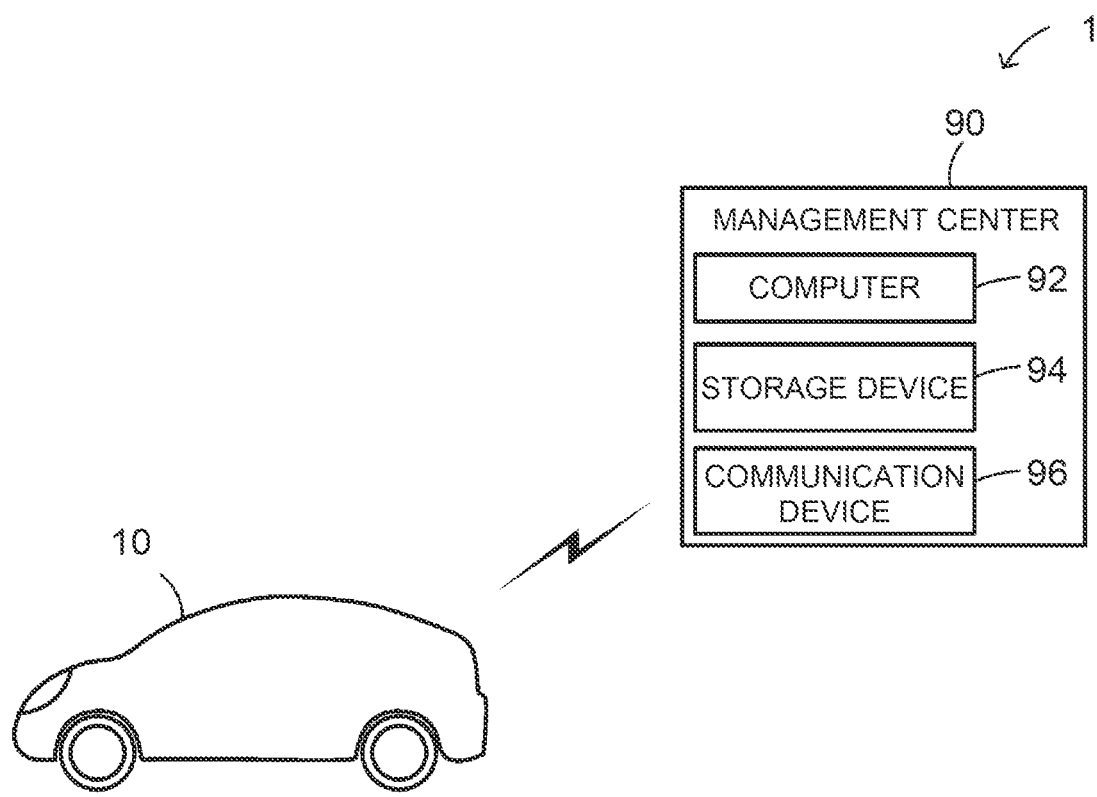
FIG. 1 is a configuration diagram showing an outlined configuration of a vehicle diagnosis system 1 including an apparatus for diagnosing remaining belt life as an embodiment of the present disclosure.
Figure 2:
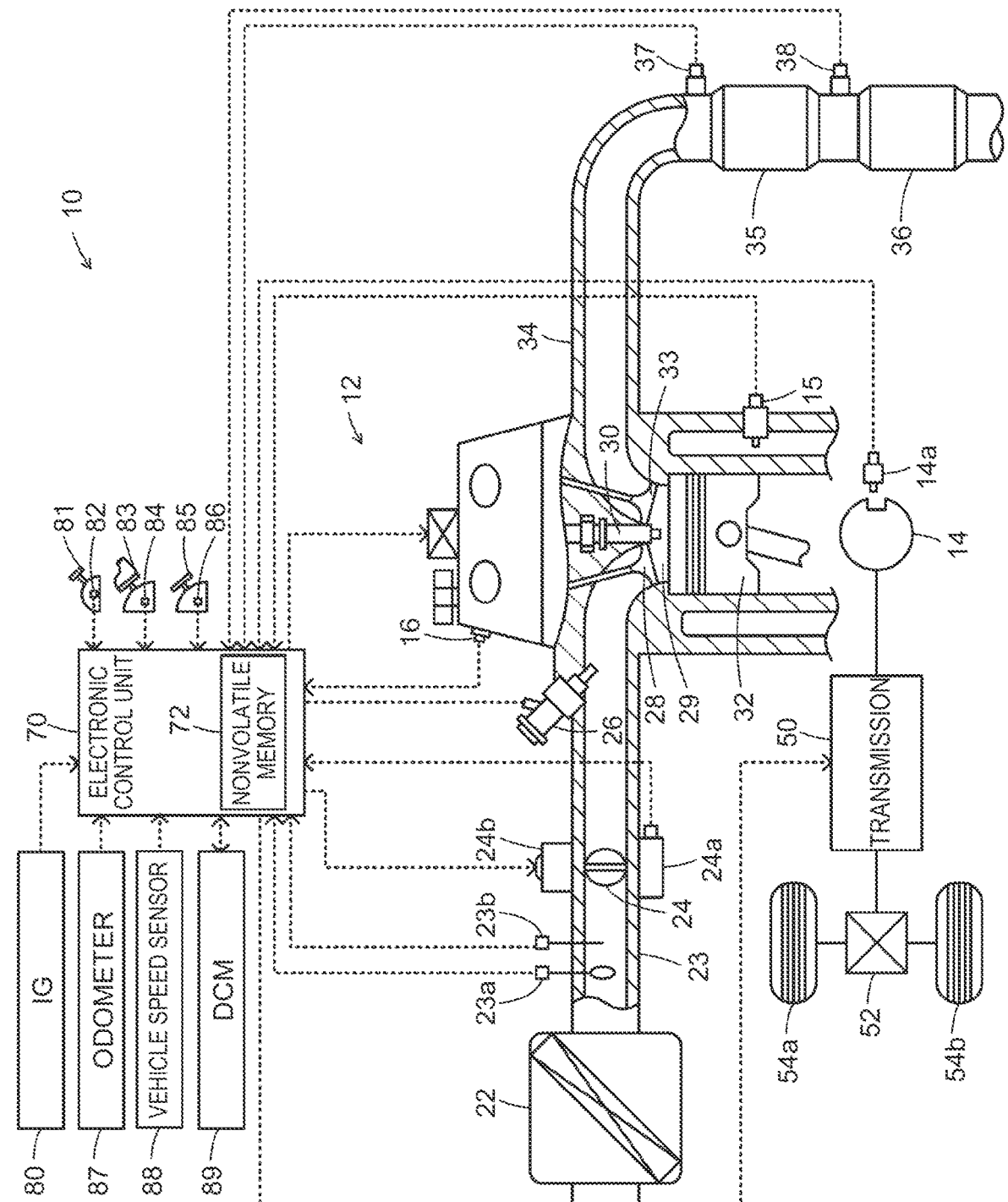
FIG. 2 is a configuration diagram showing an outlined configuration of an automobile 10.
Figure 3:
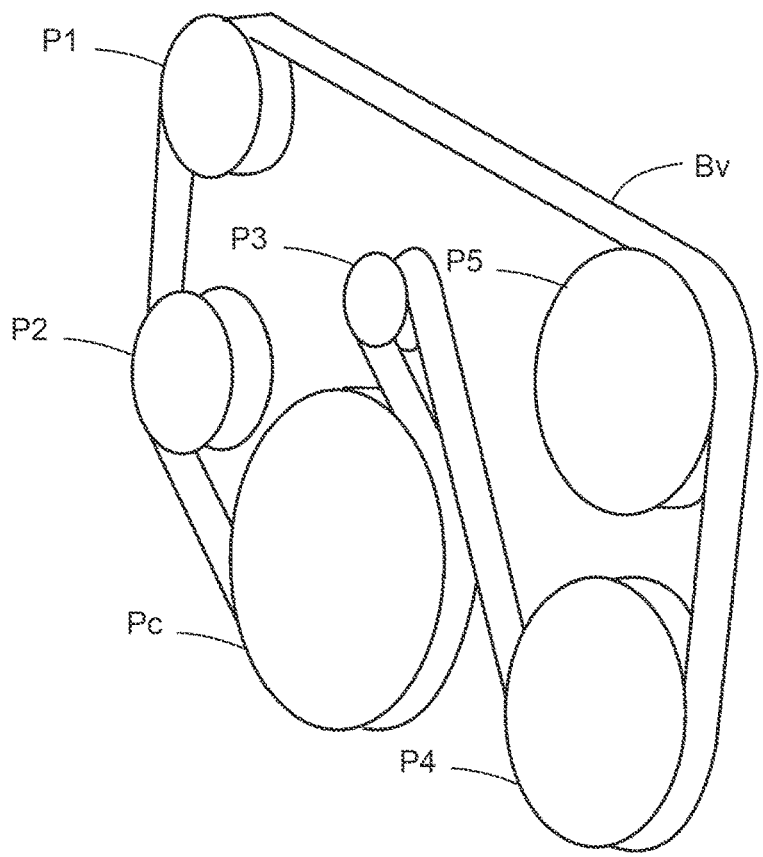
FIG. 3 is a configuration diagram showing an outlined configuration of a V-ribbed belt Bv.

FIG. 1 is a configuration diagram showing an outlined configuration of a vehicle diagnosis system 1 including an apparatus for diagnosing remaining belt life as an embodiment of the present disclosure. FIG. 2 is a configuration diagram showing an outlined configuration of an automobile 10. FIG. 3 is a configuration diagram showing an outlined configuration of a V-ribbed belt Bv. The vehicle diagnosis system 1 includes the automobile 10 and a management center 90.

The automobile 10 includes an engine 12, a transmission 50, and an electronic control unit (hereinafter referred to as "ECU") 70 that controls the entire vehicle.

The engine 12 is configured as an internal combustion engine that outputs motive power by using fuel such as gasoline, and gas oil. The engine 12 sucks the air cleaned by an air cleaner 22 into an intake pipe 23, passes the air through a throttle valve 24, while injecting fuel from a fuel injection valve 26 in the intake pipe 23 downstream of the throttle valve 24 so as to mix the air with the fuel. The thus-obtained air-fuel mixture is then taken into a combustion chamber 29 through an intake valve 28, and is exploded and combusted by electric spark generated by an ignition plug 30. The energy of explosion and combustion pushes down a piston 32 to cause reciprocating movement, which is converted into rotational movement of a crankshaft 14. Exhaust gas discharged from the combustion chamber 29 to an exhaust pipe 34 via an exhaust valve 33 is discharged to the outside air through exhaust gas control apparatuses 35, 36 having catalysts (three-way catalysts) that remove harmful components including carbon monoxide (CO), hydrocarbon (HC), and nitrogen oxide (NOx).

The crankshaft 14 has a crankshaft pulley Pc attached to the tip thereof. The crankshaft pulley Pc has a V-ribbed belt Bv fitted to its outer periphery. The V-ribbed belt Bv is fitted with pulleys P1 to P5 that drive unshown accessories (coolant pump, alternator, etc.) of the engine 12. The V-ribbed belt Bv is driven by the crankshaft 14, that is, the engine 12. The motive power from the engine 12 is transferred to the accessories of the engine 12 via the crankshaft 14, the crankshaft pulley Pc, the V-ribbed belt Bv, and the pulleys P1 to P5.

The engine 12, the V-ribbed belt Bv, the crankshaft pulley Pc, the accessories of the engine 12, and the pulleys P1 to P5 are housed in an unshown engine compartment for housing the engine 12.

The transmission 50 is connected to the crankshaft 14 of the engine 12 and also connected to drive wheels 54a, 54b via a differential gear 52.

The ECU 70 is configured as a microprocessor having a CPU as a main component. The ECU 70 includes, in addition to the CPU, a ROM that stores processing programs, a RAM that temporarily stores data, a nonvolatile memory 72 that stores data in a nonvolatile manner, and input and output ports.

The ECU 70 receives signals from various sensors through the input port. Examples of the signals input into the ECU 70 may include a crank angle θcr from a crank position sensor 14a that detects the rotational position of the crankshaft 14 of the engine 12, and a coolant temperature Tw from a coolant temperature sensor 15 that detects the temperature of coolant of the engine 12. The examples of the signals may also include a throttle opening TH from a throttle position sensor 24a that detects the position of the throttle valve 24, cam angles θci, θco from cam position sensors 16 that detect the rotational position of an intake camshaft that opens and closes the intake valve 28 and the rotational position of an exhaust camshaft that opens and closes an exhaust valve 33. The examples of the signals may also include an intake air quantity Qa from an air flowmeter 23a attached to the intake pipe 23, an intake air temperature Ta from a temperature sensor 23b attached to the intake pipe 23, an air-fuel ratio AF from an air-fuel ratio sensor 37 attached to the exhaust pipe 34 on an upstream side of the exhaust gas control apparatus 35, and an oxygen signal O2 from an oxygen sensor 38 attached to the exhaust pipe 34 between the exhaust gas control apparatus 35 and the exhaust gas control apparatus 36. The examples of the signals may also include an ignition signal IG from an ignition switch 80, a shift position SP from a shift position sensor 82 that detects an operative position of a shift lever 81. The examples of the signals may also include an accelerator pedal operation amount Acc from an accelerator pedal position sensor 84 that detects a stepping-in amount of an accelerator pedal 83, a brake pedal position BP from a brake pedal position sensor 86 that detects a stepping-in amount of a brake pedal 85, a total travel distance Dt from an odometer 87 that integrates the travel distance since the shipment of the vehicle, and a vehicle speed V from a vehicle speed sensor 88.

The ECU 70 outputs various control signals through the output port. Examples of the signals output from the ECU 70 may include a control signal to a throttle motor 24b that regulates the position of the throttle valve 24, a control signal to the fuel injection valve 26, and a control signal to the ignition plug 30. The examples of the signals may also include a control signal to the transmission 50.

The ECU 70 calculates a speed Ne of the engine 12 based on the crank angle θcr from the crank position sensor 14a. The ECU 70 also calculates a load factor (a ratio of the volume of air actually taken in per cycle to a stroke volume of the engine 12 per cycle) KL based on the intake air quantity Qa from the air flowmeter 23a and the speed Ne of the engine 12.

The ECU 70 communicates with the management center 90 via a data communication module (DCM) 89 to exchange various data.

In the automobile 10, the ECU 70 sets a target gear stage Gs* of the transmission 50 based on the accelerator operation amount Acc or the vehicle speed V, and controls the transmission 50 such that the gear stage Gs of the transmission 50 coincides with the target gear stage Gs*. The ECU 70 also sets a target torque Te* for the engine 12 based on the accelerator operation amount Acc, the vehicle speed V, and the gear stage GS of the transmission 50. Based on the set target torque Te*, the ECU 70 performs intake air quantity control that controls the opening of the throttle valve 24, fuel injection control that controls the quantity of fuel injected from the fuel injection valve 26, and ignition control that controls ignition timing of the ignition plug 30.

The management center 90 includes a computer 92 serving as a management server, a storage device 94, and a communication device 96. The computer 92 includes, in addition to the CPU, a ROM that stores processing programs, a RAM that temporarily stores data, input and output ports, and a communication port. For example, the storage device 94 is configured as a hard disk, an SSD, or the like. The communication device 96 communicates with the DCM 89 of the automobile 10. The computer 92, the storage device 94 and the communication device 96 are connected to each other via signal lines.

Figure 4:
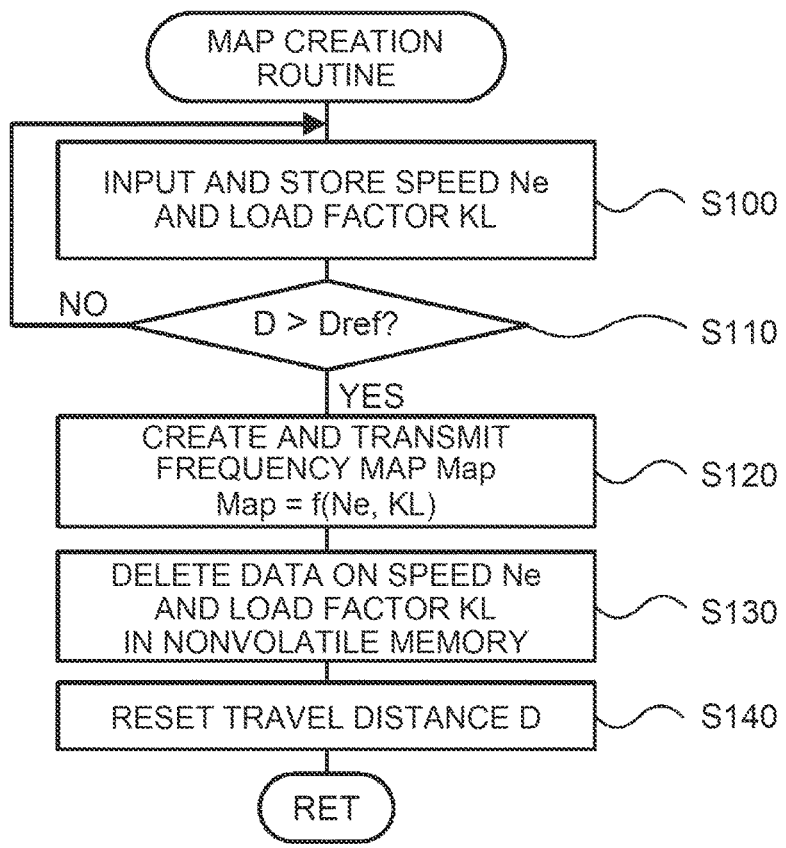
FIG. 4 is a flowchart showing an example of a map creation routine executed by an ECU 70 of the automobile 10.

Description is now given of the operation of the thus-configured vehicle diagnosis system 1 including an apparatus for diagnosing remaining belt life of the embodiment, and particularly, the operation relating to diagnosing the remaining life of the V-ribbed belt Bv. FIG. 4 is a flowchart showing an example of a map creation routine executed by the ECU 70 of the automobile 10. The map creation routine is repeatedly executed when the automobile 10 is started to be used (for example, when the automobile 10 is shipped from the factory and the system is started up, or when a user purchases the automobile 10 and the system is started up for the first time).

When the map creation routine is executed, the CPU of the ECU 70 performs the process of inputting and storing a speed Ne and a load factor KL of the engine 12 in the nonvolatile memory 72 (step S100). The ECU 70 then determines whether a travel distance D after the start of executing the map creation routine exceeds a prescribed distance Dref (step S110). The prescribed distance Dref is a threshold value used to determine whether or not to diagnose the remaining life of the V-ribbed belt Bv. Examples of the prescribed distance Dref may include a predetermined value as an average of travel distances of typical automobiles per one month (1000 km, 1500 km, 2000 km, etc.).

When the travel distance D is equal to or less than the prescribed distance Dref, the ECU 70 returns to step S100 and repeats steps S100, S110 until the travel distance D exceeds the prescribed distance Dref. Therefore, the ECU 70 accumulates, without deleting, the speed Ne and the load factor KL of the engine 12 that are input in step S100 in the nonvolatile memory 72 until the travel distance D exceeds the prescribed distance Dref.

When the travel distance D exceeds the prescribed Dref in step S110, the ECU 70 creates a frequency map Map using the speed Ne and the load factor KL of the engine 12 stored in the nonvolatile memory 72, and transmits the frequency map Map to the management center 90 (step S120). The frequency map Map is frequency distribution of an operation point Po that is made up of the speed Ne and the load factor KL of the engine 12 in a period of time during which the automobile 10 drives the prescribed distance Dref.

Figure 5:
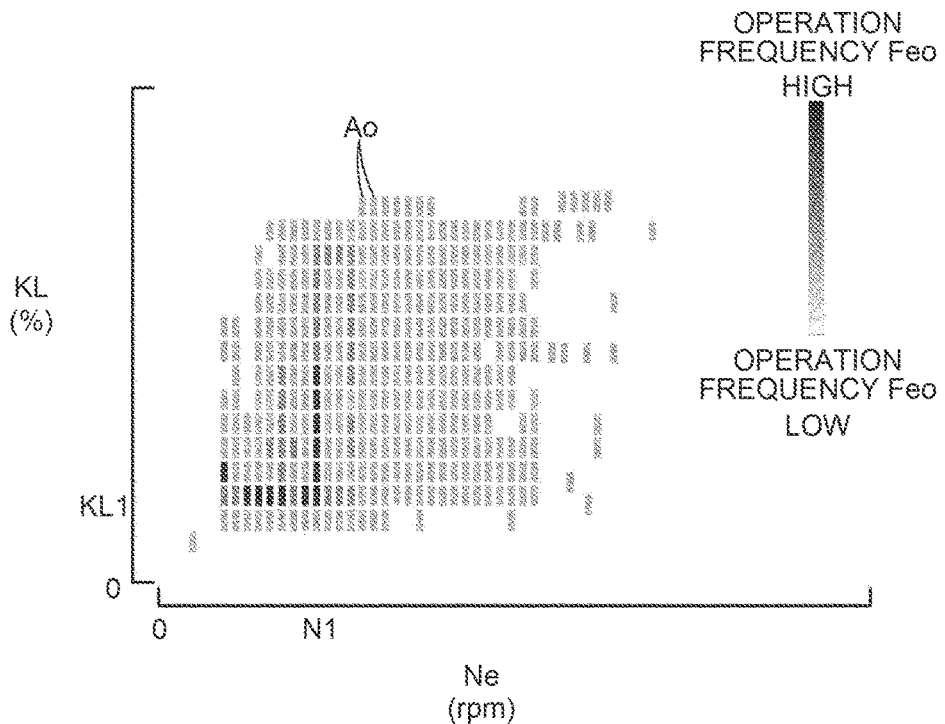
FIG. 5 is an explanatory view showing an example of a frequency map Map.

The frequency map Map is created in the following method. First, a range Rne and a range Rkl, predefined as a range of the speed Ne and a range of the load factor KL that can be taken by the engine 12 when the engine 12 is in operation, are divided into a plurality of operation areas Ao for every prescribed speed dN (for example, every 200 rpm, 400 rpm, 600 rpm, etc.) and every prescribed rate dKL (for example, 4%, 5%, 6%, etc.), respectively. Then, the operation frequency (number of operations) Feo of the engine 12 at the operation point Po (speed Ne and load factor KL) included in each operation area Ao is derived from the data on the speed Ne and the load factor KL stored in the nonvolatile memory 72, and thereby the frequency map Map is created. FIG. 5 is an explanatory view showing an example of the frequency map Map. In the frequency map Map, the operation areas Ao with a higher operation frequency Feo are displayed darker than the operation areas Ao with a lower operation frequency Feo.

Once the frequency map Map is created and transmitted to the management center 90, the data on the speed Ne and the load factor KL of the engine 12 stored in the nonvolatile memory 72 is deleted (step S130), the travel distance D is reset to a value of zero (step S140), and the map creation routine is ended.

As the map creation routine in FIG. 4 is repeatedly executed, every time the automobile 10 travels the prescribed distance Dref, the ECU 70 creates the frequency map Map and transmits the frequency map Map to the management center 90, and deletes the data on the speed Ne and the load factor KL of the engine 12 stored in the nonvolatile memory 72. Therefore, as compared with the configuration of retaining, without deleting, the data on the speed Ne and the load factor KL of the engine 12 whenever the automobile 10 travels the prescribed distance Dref, reduction in storage capacity of the nonvolatile memory 72 is achieved.

Figure 6:
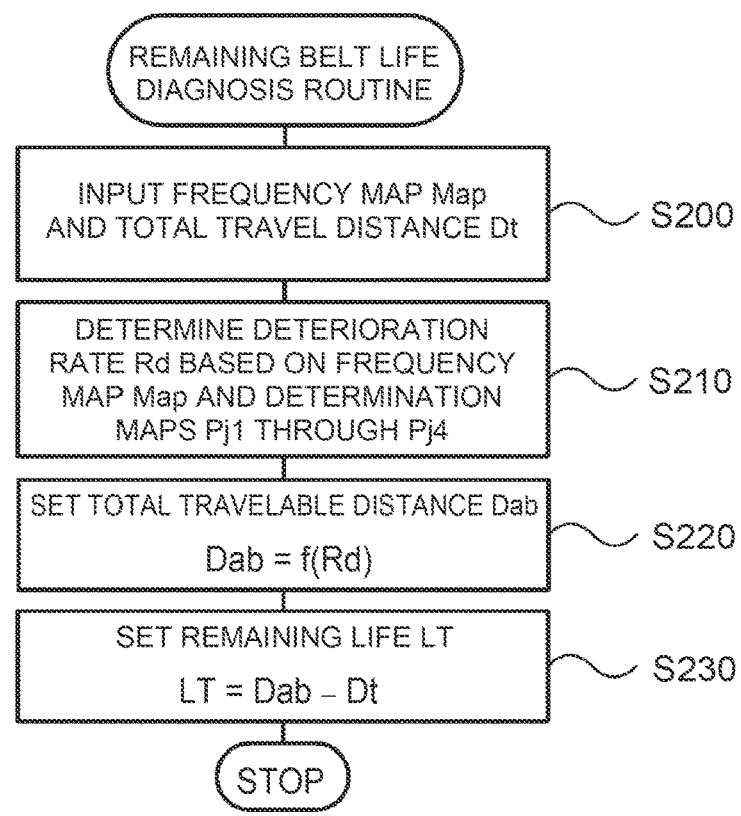
FIG. 6 is a flowchart showing an example of a remaining belt life diagnosis routine executed by a computer 92 of a management center 90.

When the frequency map Map is received via the communication device 96, the computer 92 in the management center 90 performs the following process. FIG. 6 is a flowchart showing an example of the remaining belt life diagnosis routine executed by the computer 92 of the management center 90.

When the remaining belt life diagnosis routine is executed, the computer 92 of the management center 90 performs a process of inputting the frequency map Map and a total travel distance Dt (step S200). The total travel distance Dt is a value detected by the odometer 87 of the automobile 10 and input via the DCM 89 and the communication device 96.

Then, the computer 92 compares the shape and shade of the frequency map Map with the shape and shade of the determination maps (determination frequency distributions) Pj1 to Pj4 to determine a deterioration rate Rd of the V-ribbed belt Bv as a deterioration degree (step S210). The determination maps Pj1 to Pj4 are defined in advance by experiments and analysis as the frequency distributions of the operation point Po corresponding to the deterioration rate of the V-ribbed belt Bv.

Figure 7:
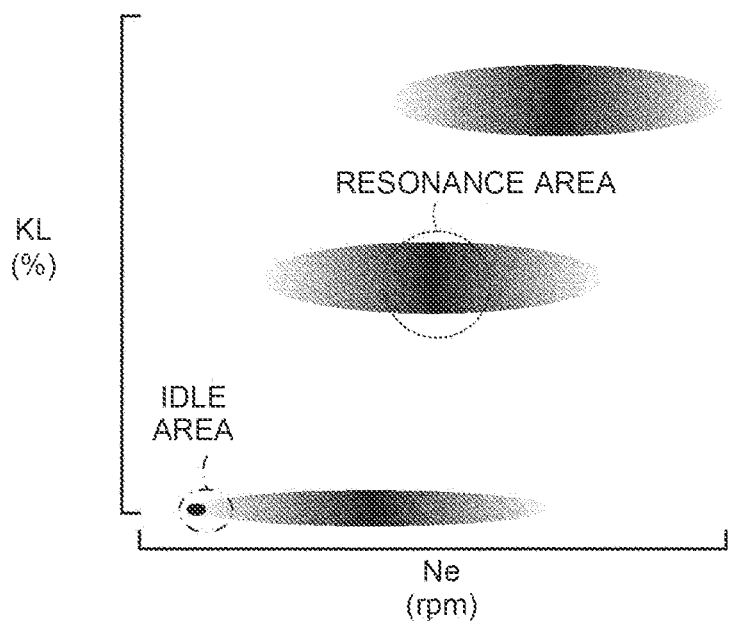
FIG. 7 is an explanatory view showing an example of a determination map Pj1 in the case where the V-ribbed belt Bv has a high deterioration rate.
Figure 8:
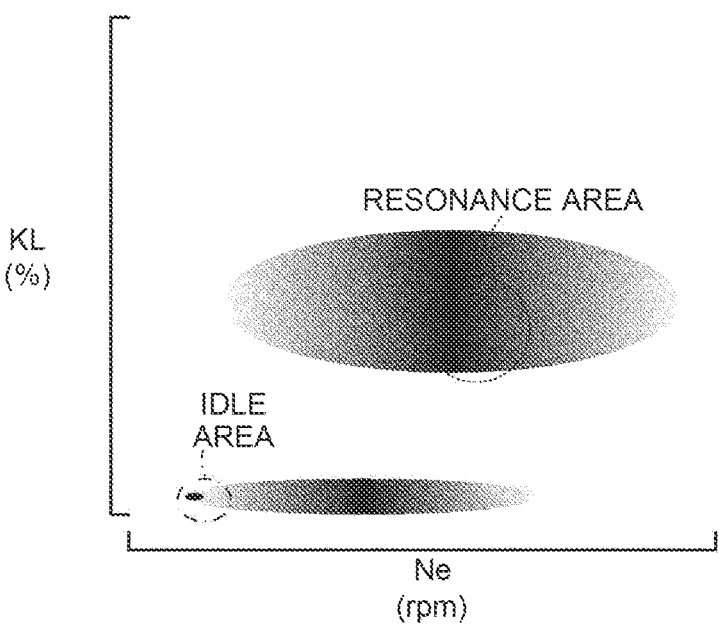
FIG. 8 is an explanatory view showing an example of a determination map Pj2 in the case where the V-ribbed belt Bv has a low deterioration rate.
Figure 9:
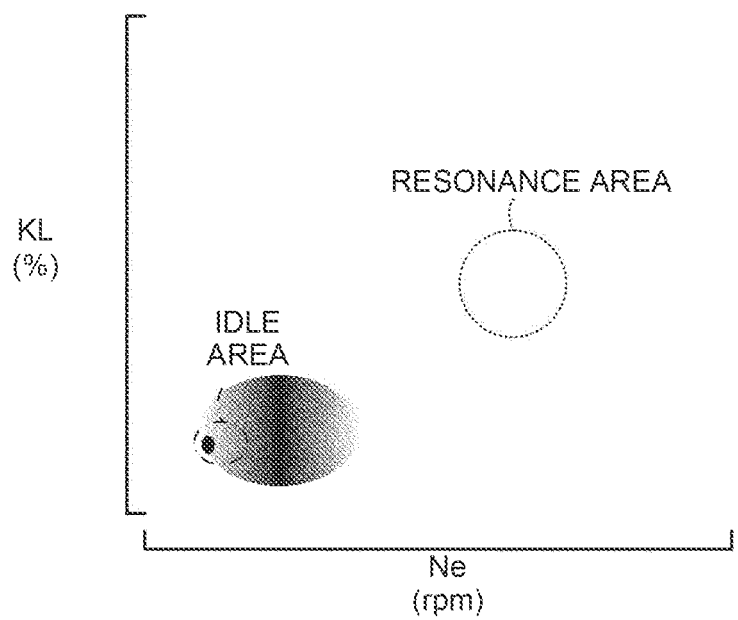
FIG. 9 is an explanatory view showing an example of a determination map Pj3 in the case where the V-ribbed belt Bv has a higher deterioration rate than that in the determination map Pj2 and a lower deterioration rate than that in the determination map Pj1.
Figure 10:
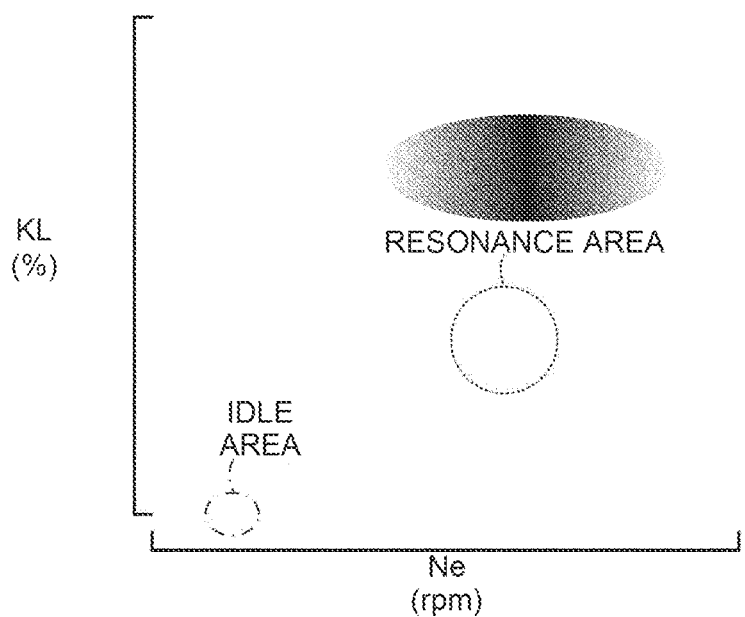
FIG. 10 is an explanatory view showing an example of a determination map Pj4 in the case where the V-ribbed belt Bv has a higher deterioration rate than that in the determination map Pj2 and a lower deterioration rate than that in the determination map Pj1.

FIG. 7 is an explanatory view showing an example of the determination map Pj1. FIG. 8 is an explanatory view showing an example of the determination map Pj2. FIG. 9 is an explanatory view showing an example of the determination map Pj3. FIG. 10 is an explanatory view showing an example of the determination map Pj4. In FIGS. 7 to 10, a resonance area indicated by a broken line is an operation area of a medium speed and a medium load factor where resonance occurs in the V-ribbed belt Bv. An idle operation area shown by a dashed line is an operation area around an idle operation point relating to idle operation of the engine 12. In the determination maps Pj1 to Pj4, the operation areas Ao with a higher operation frequency Feo are displayed darker than the operation areas Ao with a lower operation frequency.

As shown in FIG. 7, in the determination map Pj1, the operation frequency Feo at the operation point Po in the resonance area, the operation frequency Feo in the idle operation area, and the operation frequency Feo in the operation area that is out of the resonance area and out of the idle operation area (in the drawing, a high speed and high load area) are high. As shown in FIG. 8, in the determination map Pj2, the operation frequency Feo at the operation point Po in the resonance area, and the operation frequency Feo in the idle operation area are high. As shown in FIG. 9, in the determination map Pj3, the operation frequency Feo in the idle operation area is high. As shown in FIG. 10, in the determination map Pj4, the operation frequency Feo in the operation area that is out of the resonance area and out of the idle operation area (in the drawing, a high speed and high load area) is high. When the operation frequency Feo of the engine 12 at the operation point Po in the resonance area is higher, it is considered that the V-ribbed belt Bv vibrates more and generates heat more frequently, and therefore the deterioration rate (deterioration degree) of the V-ribbed belt Bv becomes greater than when the operation frequency Feo is lower. Moreover, when the engine 12 is in idle operation, the vehicle is often in a stopped state, and so there is less traveling wind. Accordingly, heat does not escape from the engine compartment where the engine 12 is stored, which increases the temperature in the engine compartment. Hence, the temperature of the V-ribbed belt Bv increases and deterioration of the V-ribbed belt Bv is promoted. As a result, when the operation frequency Feo of the engine 12 in the idle operation area is higher, the deterioration rate (degree of deterioration) of the V-ribbed belt Bv is considered to become greater than when the operation frequency Feo is lower. Therefore, the deterioration rate is faster (the degree of deterioration is higher) in the order of the determination maps Pj1 to Pj4. Hence, the determination maps Pj1 to Pj4 are appropriately reflect the deterioration rate.

The comparison between the shape and shade of the frequency map Map and the shape and shade of the measurement maps Pj1 to Pj4 in step S210 is performed using image recognition by artificial intelligence (AI) with the frequency map Map and the measurement maps Pj1 to Pj4 being regarded as images.

In the image recognition process by the artificial intelligence (AI), the AI first applies preprocessing, such as noise reduction and background removal, to the frequency map Map as an image, and executes image recognition. In the image recognition by the AI, features as an image are first extracted from the image of the operation frequency Feo that is expressed by shades (for example, features such as the presence of darker areas where the speed Ne is relatively low and the load factor KL is relatively low in FIG. 5). Then, the extracted features are compared with the features of the determination maps Pj1 to Pj4 learned by the AI.

As shown in FIG. 7, the determination map Pj1 may include features such as that three ellipses are placed at intervals and the center of each ellipse is darker than their periphery. As shown in FIG. 8, the determination map Pj2 may include features such as that two oblong ellipses are placed at an interval and the center of each ellipse is darker than their periphery. The features of the determination map Pj3 may include, as shown in FIG. 9, that there is one ellipse on the lower left side and that the center of the ellipse is darker than its periphery. As shown in FIG. 10, the determination map Pj4 may include features such as that one oblong ellipse is placed on the upper right side and the center of the ellipse is darker than its periphery.

When the features of the frequency map match any one of the features of the determination maps Pj1 to Pj4, the computer 92 determines that the deterioration rate Rd of the V-ribbed belt Bv is the deterioration rate corresponding to the matching determination map. The frequency map Map is set using the operation frequency Feo obtained by actual operation of the engine 12 at the operation point Po. Accordingly, the deterioration rate of the V-ribbed belt Bv, that is, the degree of deterioration, can be determined more accurately as compared with the case of determining the deterioration rate using analysis programs.

Once the deterioration rate Rd is determined, the computer 92 sets a total travelable distance Dab based on the deterioration rate Rd (step S220). The total travelable distance Dab, which is a distance that the vehicle can travel before the V-ribbed belt Bv reaches its end of life, is defined in advance by experiments or analysis. The total travelable distance Dab is set to be longer when the deterioration rate Rd is higher than when the deterioration rate Rd is lower.

When the total travelable distance Dab is set in this way, the computer 92 sets a value obtained by subtracting the total travel distance Dt input in step S200 from the total travelable distance Dab (=Dab−Dt), i.e., the distance that the vehicle can travel from the present time until the V-ribbed belt Bv reaches its end of life, as remaining life LT of the V-ribbed belt Bv (step S230), and ends the remaining belt life diagnosis routine. Thus, the frequency distribution of the operation point Po of the actual engine 12 is used to diagnose the remaining life LT of the V-ribbed belt Bv. This makes it possible to achieve more accurate diagnosis of the remaining life LT of the V-ribbed belt Bv.

Moreover, the frequency map Map and the determination maps Pj1 to Pj4 predefined for the respective deterioration rates (degrees of deterioration) of the V-ribbed belt Bv are used to set a deterioration rate (degree of deterioration) Rd of the V-ribbed belt Bv, and based on the set deterioration rate (degree of deterioration) Rd, the remaining life LT of the V-ribbed belt Bv is set. This makes it possible to achieve more appropriate diagnosis of the remaining life of the V-ribbed belt Bv.

When the travel distance of the automobile 10 reaches the remaining life LT since diagnosing the remaining life LT of the V-ribbed belt Bv, the management center 90 determines that the V-ribbed belt Bv reaches its end of life, and transmits information to encourage replacement of the V-ribbed belt Bv to the automobile 10. The automobile 10 that has received the information to encourage the replacement of the V-ribbed belt Bv can encourage the user to replace the V-ribbed belt Bv by displaying the information on the display in the vehicle cabin, which is not shown.

According to the vehicle diagnosis system 1 including the apparatus for diagnosing remaining belt life of the embodiment described above, the degree of deterioration of the V-ribbed belt Bv is set based on the frequency map Map that is the frequency distribution of the operation point Po that is made up of the speed Ne and the load factor KL of the engine 12. This makes it possible to achieve accurate diagnosis of the remaining life of the V-ribbed belt Bv.

Moreover, the frequency map Map and the determination maps Pj1 to Pj4 set for the respective deterioration rates (degrees of deterioration) of the V-ribbed belt Bv may be used to set the deterioration rate (degree of deterioration) Rd of the V-ribbed belt Bv, and based on the set deterioration rate (degree of deterioration) Rd of the V-ribbed belt Bv may be set. This allows more appropriate diagnosis of the remaining life of the V-ribbed belt Bv.

Furthermore, among the determination maps Pj1 to Pj4, the determination map for a higher deterioration degree is set to have a higher operation frequency Feo at the operation point Po being within the resonance area than the determination map for a lower deterioration degree, the resonance area being an operation area of the engine 12 where resonance is generated on the V-ribbed belt Bv. This makes it possible to provide more appropriate determination maps Pj1 to Pj4.

Among the determination maps Pj1 to Pj4, the determination map for a higher deterioration degree is set to have a higher operation frequency Feo at the idle operation area than the determination map for a lower deterioration degree. This makes it possible to provide more appropriate determination maps Pj1 to Pj4.

The vehicle diagnosis system 1 including the apparatus for diagnosing remaining belt life of the embodiment creates the frequency map Map as the frequency distribution of the operation point Po that is made up of the speed Ne and the load factor KL of the engine 12 in the map creation routine illustrated in FIG. 4. However, when the speed Ne and the load factor KL of the engine 12 input in step S100 are equal to a speed Nidl and a load factor Kidl with a value zero (=0), which are provided when the engine 12 is in idle operation, the vehicle speed V from the vehicle speed sensor 88 may be input and stored in the nonvolatile memory 72 together with the speed Ne and the load factor KL of the engine 12. Then, along with the processing of step S120, the number of times N1 (frequency) that the vehicle speed V is equal to or greater than a prescribed vehicle speed Vref and the number of times N2 (frequency) that the vehicle speed V is less than the prescribed vehicle speed Vref may be counted, and the numbers N1, N2 may be transmitted to the management center 90. The prescribed vehicle speed Vref is set to vehicle speeds (e. g., several tens km/h) that are obtained in the situations where fresh air is introduced into the engine compartment and the ambient air temperature around the V-ribbed belt Bv is lowered, such as when the accelerator pedal 83 is turned off and the vehicle is decelerating. In this case, when the number N1 is equal to or greater than the number N2, the temperature of the V-ribbed belt Bv is lowered, and the remaining life of the V-ribbed belt Bv is considered to be longer than when the number N1 is less than the number N2. Therefore, in the remaining belt life diagnosis routine in FIG. 6, when the number N1 is less than the number N2 in step S230, a value obtained by subtracting the total travel distance Dt from the total travelable distance Dab may be set as the remaining life LT. When the number N1 is equal to or greater than the number N2, a value obtained by adding a prescribed distance Dn to the total travel distance Dt and subtracting the obtained value from the total travelable distance Dab may be set as the remaining life LT.

According to the vehicle diagnosis system 1 including the apparatus for diagnosing remaining belt life of the embodiment, in the map creation routine illustrated in FIG. 4, the speed Ne and the load factor KL are input and stored in the nonvolatile memory 72 in step S100, and the frequency map Map is created using the speed Ne and the load factor KL and is transmitted to the management center 90 in step S120. However, the fuel injection rate may be used instead of the load factor KL.

According to the vehicle diagnosis system 1 including the apparatus for diagnosing remaining belt life of the embodiment, the deterioration rate (degree of deterioration) Rd of the V-ribbed belt Bv is set based on the shape and shade of the frequency map Map and the shape and shade of the determination maps Pj1 to Pj4 set for the respective deterioration rates of the V-ribbed belt Bv. However, as long as the frequency map Map and the determination maps Pj1 to Pj4 are used, the deterioration rate (degree of deterioration) Rd of the V-ribbed belt Bv may be set in other ways. For example, the deterioration rate (degree of deterioration) Rd of the V-ribbed belt Bv may be set based on the shape of the frequency map Map and the shape of the determination maps Pj1 to Pj4, without considering the shade of the frequency map Map and the determination maps Pj1 to Pj4. The deterioration rate (degree of deterioration) Rd of the V-ribbed belt Bv may also be set based on the shade of the frequency map Map and the shade of the determination maps Pj1 to Pj4, without considering the shape of the frequency map Map and the determination maps Pj1 to Pj4.

According to the vehicle diagnosis system 1 including the apparatus for diagnosing remaining belt life of the embodiment, the deterioration rate (degree of deterioration) Rd of the V-ribbed belt Bv is set based on the shape and shade of the frequency map Map and the shape and shade of the determination maps Pj1 to Pj4 set for the respective deterioration rates of the V-ribbed belt Bv, and based on the set deterioration rate (degree of deterioration) Rd, the remaining life of the V-ribbed belt Bv is diagnosed. However, the remaining life of the V-ribbed belt Bv may be diagnosed using only the frequency map Map without using the determination maps Pj1 to Pj4. In this case, when, in the frequency map Map, the operation frequency Feo, which is the frequency of the operation point Po being within the resonance area where resonance is generated on the V-ribbed belt Bv, is high, the remaining life LT may be set to be shorter than when the operation frequency Feo is low. When the operation frequency Feo, which is the frequency of the operation point Po being an idle operation point relating to idle operation of the engine 12, is high, the remaining life LT may be set to be shorter than when the operation frequency Feo is low.

In the vehicle diagnosis system 1 including the apparatus for diagnosing remaining belt life of the embodiment, the ECU 70 of the automobile 10 executes the map creation routine illustrated in FIG. 4. However, the computer 92 in the management center 90 may execute part or all of the map creation routine.

In the vehicle diagnosis system 1 including the apparatus for diagnosing remaining belt life of the embodiment, the computer 92 in the management center 90 executes the remaining belt life diagnosis routine illustrated in FIG. 6. However, the ECU 70 of the automobile 10 may execute part or all of the remaining belt life diagnosis routine.

The vehicle diagnosis system 1 including the apparatus for diagnosing remaining belt life of the embodiment diagnoses the remaining life of the V-ribbed belt Bv. However, an object to be diagnosed is not limited to the V-ribbed belt Bv, and any belt driven by the engine 12 may be diagnosed.

In the vehicle diagnosis system 1 including the apparatus for diagnosing remaining belt life of the embodiment, the present disclosure is applied to the system including the automobile 10 that travels with motive power from the engine 12. However, the automobile 10 may be a hybrid vehicle that can be driven by motive power from the engine 12 and motive power from a motor. In addition, the present disclosure may be applied to vehicles different from automobiles, such as trains and construction machinery, instead of the automobile 10. Furthermore, the present disclosure is not limitedly applied to the vehicles mounted with the engine 12. The present disclosure may be applied to apparatuses different from the vehicles, such as engine apparatuses installed in power generation facilities mounted with the engine 12.

Description is given of correspondence relation between the main elements of the embodiment and the main elements of the present disclosure described in Summary. In the embodiment, the ECU 70 of the automobile 10 and the computer 92 of the management center 90 are equivalent to the "apparatus for diagnosing remaining belt life".

Since the correspondence relation between the main elements of the embodiment and the main elements of the present disclosure described in Summary is an example for specific description of the aspect for carrying out the present disclosure described in Summary, the correspondence relation is not intended to limit the elements of the present disclosure described in Summary. More specifically, the present disclosure disclosed in Summary should be interpreted based on the description therein, and the embodiments are merely specific examples of the present disclosure disclosed in Summary.

Although the aspects for carrying out the present disclosure have been described using the embodiments, the applicable embodiment is not limited in any manner to the embodiments disclosed. It should naturally be understood that the present disclosure can be carried out in various aspects without departing from the scope of the present disclosure.

The present disclosure is applicable in the fields such as manufacturing the apparatuses for diagnosing belt remaining life.

What is claimed is:

1. A computer apparatus for diagnosing remaining belt life of a belt driven by an engine, wherein the engine is associated with a crank position sensor configured to detect a rotational position of a crankshaft of the engine, and an air flowmeter attached to an air intake for the engine and configured to detect an air intake quantity, the computer apparatus comprising:
a memory device storing program instructions; and
a computer processing device configured to:
receive a signal from the crank position sensor indicative of a crank angle and calculate a speed of the engine based on the crank angle,
receive a signal from the air flowmeter indicative of a volume of air taken into the engine per cycle and calculate a load factor on the engine based on a ratio of the volume of air taken into the engine per cycle to a stroke volume of the engine per cycle, and
execute the program instructions to perform operations comprising:
inputting and storing the speed of the engine and the load factor until a vehicle in which the engine is operating has traveled a distance that exceeds a predetermined travel distance,
creating a frequency map that is a frequency distribution of engine operation points by dividing a range of speeds of the engine and a range of load factors of the engine during operation within the predetermined travel distance into a plurality of operation areas for every predetermined engine speed and load factor and determining the number of operations of the engine at each of the engine operation points characterized by a particular engine speed and load factor,
transmitting the frequency map to a management center,
deleting the stored speed of the engine and load factor and resetting the travel distance to a value of zero when the vehicle has traveled the distance that exceeds the predetermined travel distance,
comparing the frequency map with one or more predefined determination frequency distribution maps that are representative of a known amount of belt deterioration determined through empirical evidence for a same type of belt as the belt driven by the engine to diagnose the remaining life of the belt, and
determining a remaining travel distance for the vehicle based on the diagnosed remaining life of the belt and transmitting information to encourage replacement of the belt based on the determined remaining travel distance for the vehicle.

2. The apparatus according to claim 1, wherein a deterioration degree of the belt is set based on the frequency distribution and a plurality of determination maps defined for respective deterioration degrees of the belt, and the remaining life is diagnosed based on the set deterioration degree.

3. The apparatus according to claim 2, wherein among the determination maps, the determination map for a higher deterioration degree is higher in frequency of the operation point being within a resonance area than the determination map for a lower deterioration degree, the resonance area being an operation area of the engine where resonance is generated on the belt.

4. The apparatus according to claim 2, wherein among the determination maps, the determination map for a higher deterioration degree is higher in frequency of an idle operation point relating to idle operation of the engine than the determination map for a lower deterioration degree.

5. The apparatus according to claim 1, wherein when, in the frequency distribution, the frequency of the operation point being within the resonance area where resonance is generated on the belt is high, the remaining life is diagnosed to be shorter than when the frequency is low.

6. The apparatus according to claim 1, wherein when, in the frequency distribution, the frequency of the operation point being an idle operation point relating to idle operation of the engine is high, the remaining life is diagnosed to be shorter than when the frequency is low.

7. The apparatus according to claim 1, wherein the computer processing device is configured to receive a signal indicative of a fuel injection rate into the engine and use the fuel injection rate instead of the load factor in creating the frequency map.

* * * * *